D. J. TITTLE.

Car-Couplings.

No. 5,191. Reissued Dec. 17, 1872.

*Witnesses*

Alex Selkirk.

George M. Loomis.

*Inventor.*

Daniel J. Tittle.

AM PHOTO-LITHOGRAPHIC CO. N.Y. (OSBORNE'S PROCESS.)

UNITED STATES PATENT OFFICE.

ABBIE M. TITTLE, OF GREENBUSH, NEW YORK, ASSIGNEE OF DANIEL J. TITTLE.

IMPROVEMENT IN CAR-COUPLINGS.

Specification forming part of Letters Patent No. 66,448, dated July 2, 1867; reissue No. 5,191, dated December 17, 1872.

*To all whom it may concern:*

Be it known that I, DANIEL J. TITTLE, of the town of Greenbush and county of Rensselaer, State of New York, have invented certain new and useful Improvements in Car-Couplings, and the mode of operating them; and I do hereby declare that the following is a full, clear, and exact description thereof, reference being had to the accompanying drawing making a part of this specification, in which—

Figure 1:
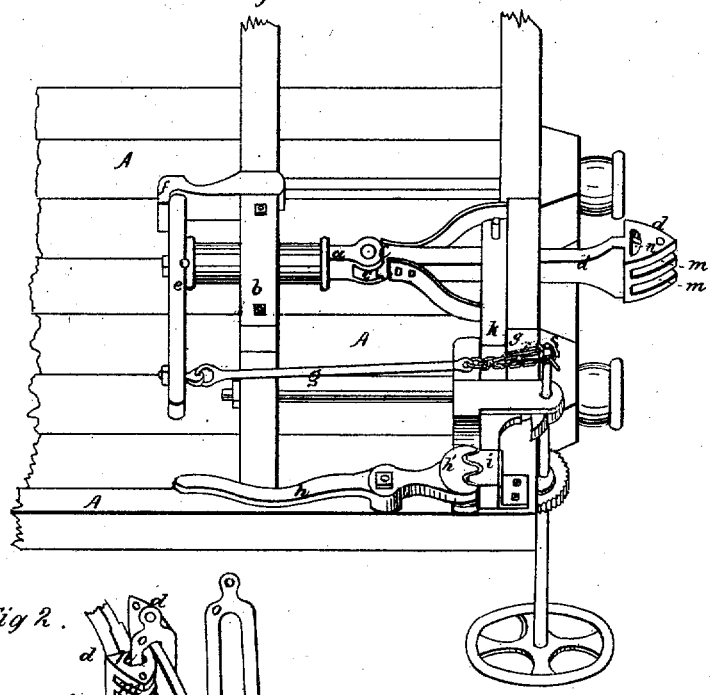
Figure 2:
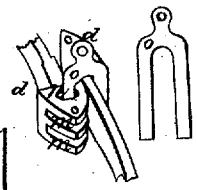

Figure 1 is a perspective view inverted; Fig. 2 is a view of draw-heads secured; and Fig. 3 is a section from beneath; the same letters indicating like parts.

The nature of my invention consists in constructing the draft-bar with a hinge placed at any suitable point between the draw-beam and the draft-bar, whereby the head is free to move in a lateral direction, while the end of the bar will be held rigid in the draw-beam. To ease the coupling-heads when being detached I place a lever against the back end of the draft-bar, and connect with its long end a rod or chain, or both, which is properly attached to the rack-wheel or segment-shaft, which shaft, when operated to throw the coupling-heads aside, will also draw the lever against the end of the draft-bar, and force it forward, and thereby ease the uncouplings. To enable a person to uncouple the cars from the ground, I provide a lever on the outer side of one of the beams of the car, one end of which has a rack, which operates in a second rack provided on the end of the rack-bar, which, when pulled out, throws the coupling-head to one side and at the same time operates the easing-lever. To adapt cars of varying heights, provided with ordinary links for coupling with the coupling of my invention, I provide two or more slots horizontally cut in the ends of the double-hook heads, in either of which the links may be inserted; and to secure the heads together firmly, I make in the heads an oblong hole, which runs down perpendicularly through the whole depth of the head, and into one of these perpendicular holes I drop one leg of the binding-clevis, which is made U-shaped, while the other leg drops down back of the coupling-head or in the perpendicular hole of the co-acting coupling-head.

By these improvements cars can be as readily uncoupled by a person standing on the ground on the side of the car as when on the platform, and when coupled can be secured from being disconnected while turning a curve, as has been proved by actual test, and cars with ordinary coupling-links with varying heights can also be accommodated.

Figure 3:
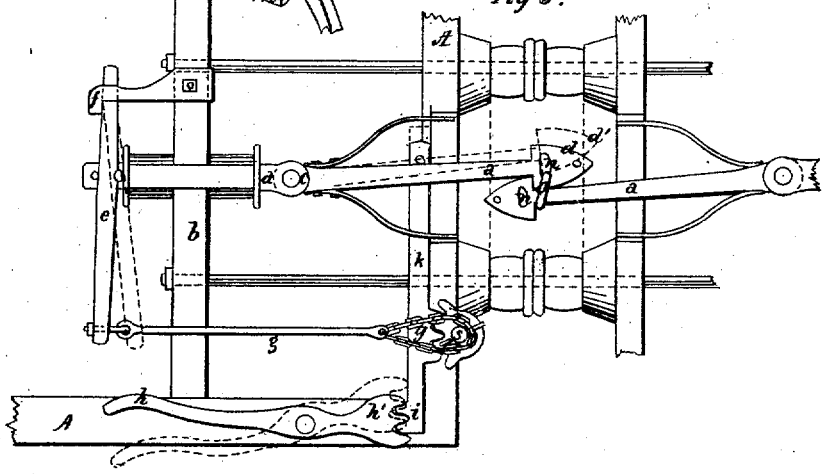

In the drawing, A, Figs. 1 and 3, represents the under side of a platform or a car to which the coupling B is attached; the said coupling B consists of the double-hook head *d* and a draft-bar, *b*. The said draft-bar *b* is pivoted to another bar, *b'*, which bar *b'* is backed up and supported by the elastic springs *c c*, and properly secured to the draw-beam *e'*. The point of jointure of the said draft-bar *b* to the elastic bar *b'*, when placed back a considerable distance from the front of the platform or car—say about six feet, more or less—will effect a better operation of the desired lateral movement of the coupling B in running a curve than if placed at a less distance from the front; and the distance of such lateral movement thus secured would be as from *k* to *k'*, Fig. 3, which would enable the said draft-bar to assume (when running a curve) an angle that will act as and be equal to a chord (of that length) of a segment of a circle or curve on which the cars may run, and in assuming such an angle the side draft of the truck-wheels on the rails would be reduced much from the side draft attending the use of a rigid coupling now used. To stiffen the said draft-bar thus pivoted and prevent any lateral movement, (other than that effected by force applied, either by means of devices hereafter described, or by the consequent draw on or push against the said draft-bar in the act of moving the car,) I attach to the sides of the draw-bar *b*, in front of the point of its jointure with the elastic bar *b'*, the springs C C. The said springs C C have their loose ends carried forward to within the yoke D, and thrown out from the draw-bar *b*, as shown in Figs. 1 and 3, so as to insure considerable lateral pressure against the inner shoulders of the yoke D in which the draw-bar *b* plays.

To operate intentionally, when required, the coupling described, I place back of the bar *b'* a lever, *e*, the short end of which is held by a suitable fulcrum, *f*. Connected with the longest end of the said lever *e* is a rod or chain, *g*, or both, which is attached to the rack-wheel or segment-shaft S, which rack-wheel shaft, when turned in either direction, throws the double-hook head *d* to one side or other, and at the same time draws, by the rod *g*, the lever *e* against the end of the bar *b'* and throws it forward.

To uncouple the cars without the aid of the hand-wheel, I provide, on one of the side beams A of the car, a suitable lever, *h*, the shortest end of which terminates in a rack, *h'*, and works another rack, *i*, on the end of the shifting-bar *l*. When the long end of the lever *h* is pulled out or pressed in, the end rack *h'* operates the shifting-bar *l*, and throws the double head *d* to one side or other, and at the same time operates the lever *e*, and throws the head forward the same as if the operation were performed by the rack-wheel shaft S.

To adapt my invention to ordinary links used in coupling, and to the varying heights of cars, I make in the face of the double-hook-heads *d* two or more horizontal slots, *m m*. Into any of these slots the ordinary coupling-links can be inserted and secured by a suitable pin, as in the ordinary way; and to prevent the cars from uncoupling when on a curve, &c., (as experiment has shown they will do when not secured,) I make a perpendicular hole, *n*, through the whole depth of the head *d*, through which I insert one leg of the U-shaped clevis O, Figs. 2 and 3, and drop the other leg down back of the head *d*, or in a similar hole, *n'*, of a co-acting head. Both legs of the said clevis are made of sufficient length to preclude all possibility of its jumping out by any jolting.

Having described my invention, what I claim, and desire to secure by Letters Patent, is—

1. The hook-headed coupling B hinged to the draw-bar, as described, and perforated for the reception of the clevis O, or its equivalent, combined with the springs *c* and wide yoke D, substantially as and for the purpose set forth.

2. The lever *e*, fulcrum *f*, and the rod and chain *g*, either or both, in combination with the rack-wheel shaft S, as and for the purpose described.

3. The lever *h* provided with the rack *h'*, in combination with the shifting-lever *l* provided with the rack *i*.

4. The hinged draft-bar *b b'*, in combination with the lever *e*, fulcrum *f*, rod and chain *g*, either or both, operated by the lever *h* or rack-wheel shaft S, as and for the purposes set forth.

5. The hook-head coupling, perforated, as described, in combination with the clevis O, or its equivalent, as and for the purpose set forth and described.

DANIEL J. TITTLE,
*Inventor.*
ABBIE M. TITTLE,
*Assignee.*

Witnesses:
JAS. A. BUCKBEE, Jr.,
ALEX. SELKIRK.